No. 753,211.

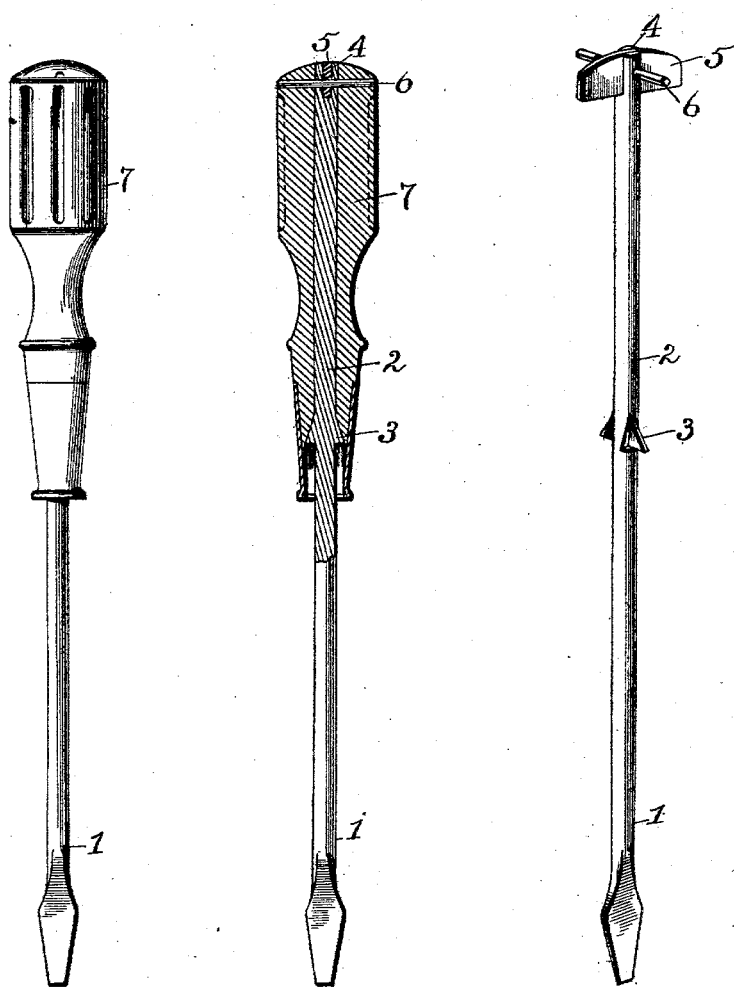

Patented February 23, 1904.

UNITED STATES PATENT OFFICE.

HERBERT S. PULLMAN, OF MERIDEN, CONNECTICUT, ASSIGNOR, BY MESNE ASSIGNMENTS, TO THE HURWOOD MANUFACTURING COMPANY, OF PLANTSVILLE, CONNECTICUT, A CORPORATION OF CONNECTICUT.

SCREW-DRIVER.

SPECIFICATION forming part of Letters Patent No. 753,211, dated February 23, 1904.

Application filed July 14, 1902. Serial No. 115,530. (No model.)

*To all whom it may concern:*

Be it known that I, HERBERT S. PULLMAN, a citizen of the United States, and a resident of Meriden, in the county of New Haven and State of Connecticut, have invented certain new and useful Improvements in Screw-Drivers, of which the following is a specification.

My invention relates to the class of tools provided with a blade portion and a shank adapted to receive a wooden handle; and the object of my invention is to provide a device of this class having means whereby the shank and handle may be easily assembled and firmly secured. A form of device by the use of which these objects may be attained is illustrated in the accompanying drawings, in which—

Figure 1 is a view in side elevation of a tool embodying my invention. Fig. 2 is a like view, but in lengthwise central section, of the handle and shank. Fig. 3 is a perspective view of the iron portion of the tool.

In the drawings herein I have illustrated my invention in connection with a screw-driver, this being a tool to which the invention is especially applicable, although it is obvious that the same invention may be embodied in other forms of tools, and a screw-driver has merely been chosen for convenience of illustration.

In the accompanying drawings the numeral 1 denotes the blade, and 2 the shank, of the screw-driver. This shank is provided near its lower end with wings 3, projecting from opposite sides of the shank and preferably struck out from the metal comprising the shank, these wings being comparatively thin. A slot 4 is formed in the outer end of the shank, in which is located a cross-piece 5. This cross-piece preferably extends to the outer surface of the handle 7, and the upper portion of the cross-piece is curved to conform to the end of the handle 7. A pin 6 projects through the handle, through the shank, and through the cross-piece 5, securing the parts firmly together. The primary objects of the cross-piece 5 are to provide means whereby a blow may be struck upon the tool without injuring the wooden part of the handle and to prevent relative turning movement of the handle and shank, and a secondary object is to prevent in connection with the pin 6 inward movement of the shank within the handle. The pin serves to firmly unite the shank and cross-piece together and in connection with the latter prevents endwise movement of the handle and shank. The wings 3 are so formed that the shank may be driven into the handle without forming other than the central hole through the handle, and when in place these wings also serve to prevent relative turning movement of the handle and shank and prevent any twisting of the shank within the handle, the tool being thus provided at each end of the handle with means for preventing relative turning movement.

In the form of construction herein illustrated and described the blade of the screw-driver may be properly formed before the handle is affixed, and this forms a valuable feature, as there are certain advantages present in a structure in which the blade may be formed and the entire operations completed on the iron part of the tool before the handle is affixed thereto.

What I claim as my invention, and desire to secure by Letters Patent, is—

1. In a screw-driver or the like, in combination, a handle having a central opening, a blade having a shank with integral projections adapted to be projected through the handle, with the integral projections forced into the material of the handle, a removable cross-piece located in a slot in the outer end of the shank and handle, and means for securing the shank and cross-piece together.

2. In a screw-driver or the like, in combination, a handle having a central opening, a blade having a shank projecting through the opening, said shank provided with integral projections extending from opposite sides thereof and adapted to be forced into the substance of the hand handle, a cross-piece located in a slot in the outer end of the shank and handle, and a pin arranged to secure the handle, shank and cross-piece together.

3. In a screw-driver or the like, in combination, a handle having a central opening, a shank projecting through said opening and having integral wings near its inner end, a cross-piece secured in a slot at the outer end of the shank and handle and arranged transversely with respect to the integral wings, and a pin projecting through the handle, shank and cross-piece.

HERBERT S. PULLMAN.

Witnesses:
JNO. A. HURLEY,
PATRICK T. O'BRIEN.